US005594068A

United States Patent [19]
Buchanan et al.

[11] Patent Number: 5,594,068
[45] Date of Patent: Jan. 14, 1997

[54] CELLULOSE ESTER BLENDS

[75] Inventors: Charles M. Buchanan, Bluff City; Robert M. Gardner, Gray; Alan W. White, Kingsport; Matthew D. Wood, Gray, all of Tenn.

[73] Assignee: Eastman Chemical Company, Kingsport, Tenn.

[21] Appl. No.: 462,717

[22] Filed: Jun. 5, 1995

Related U.S. Application Data

[62] Division of Ser. No. 69,246, May 28, 1993, abandoned.
[51] Int. Cl.⁶ .................................. C08L 1/10; C08L 1/12
[52] U.S. Cl. ............................................ 525/54.3; 525/166
[58] Field of Search ................................ 525/54.3, 166

[56] References Cited

U.S. PATENT DOCUMENTS

| | | |
|---|---|---|
| 1,683,347 | 9/1928 | Gray et al. . |
| 1,698,049 | 1/1929 | Clarke et al. . |
| 1,880,560 | 10/1932 | Webber et al. . |
| 1,880,808 | 10/1932 | Clarke et al. . |
| 1,984,147 | 12/1934 | Malm . |
| 2,012,267 | 8/1935 | Carothers . |
| 2,129,052 | 9/1938 | Fordyce . |
| 3,617,201 | 11/1971 | Beral et al. . |
| 3,668,157 | 6/1972 | Combs et al. . |
| 3,781,381 | 12/1973 | Koleske et al. . |
| 4,372,311 | 2/1983 | Potts . |
| 4,427,614 | 1/1984 | Barham et al. . |
| 4,506,045 | 5/1985 | Waniczek et al. . |
| 4,532,277 | 7/1985 | Wingler ................................ 524/37 |
| 4,533,397 | 8/1985 | Wingler et al. . |
| 4,749,773 | 6/1988 | Weaver et al. . |
| 4,770,931 | 9/1988 | Pollock et al. . |
| 4,795,641 | 1/1989 | Kashdan . |
| 4,826,903 | 5/1989 | Weaver et al. . |
| 4,845,188 | 7/1989 | Weaver et al. . |
| 4,880,592 | 11/1989 | Martini et al. . |
| 4,882,412 | 11/1989 | Weaver et al. . |
| 4,892,922 | 1/1990 | Weaver et al. . |
| 4,892,923 | 1/1990 | Weaver et al. . |
| 4,983,730 | 1/1991 | Domeshek et al. . |
| 5,104,450 | 4/1992 | Sand et al. ................................ 106/177 |
| 5,292,783 | 3/1994 | Buchanan et al. ........................ 524/37 |

FOREIGN PATENT DOCUMENTS

A0592706  10/1994  European Pat. Off. .
A9220738  3/1992  WIPO .
A9209654  11/1992  WIPO .

OTHER PUBLICATIONS

JP A 53 023 347, Mar. 1978, Patent Abstracts of Japan and Derwent Publications.
JP A 52 045 590, Apr. 1977, Derwent Publications.
Buchanan, et al., *Macromolecules*, May 1991, 24, pp. 3050–3059; Ibid., 3060–3064.
D. R. Paul and S. Newman, Academic Press, "Polymer Blends", 1978, vol. 1, pp. 52–63.
*Polym. Prepr. Am. Chem. Soc. Div. Polym. Chem.*, Apr. 1969, 10, pp. 385–390 (Peterson et al.).
Slonimskii, *J. Polym. Sci.*, 1958, 30, pp. 625–637.
Hubbell, et al., *J. Appl. Polym. Sci.*, 1977, 21, pp. 3035–3061.
Scandola, *Macromolecules*, Nov. 1992, 25, pp. 6441–6446.
Buchanan, *Macromolecules*, Nov. 1992, 25, pp. 7373–7381.
Buchanan, et al., *J. Polym. Sci.*, 1993, 47, pp. 1709–1719.
Fields and Rodriguez, *Applied Science*, "Proceedings of the Third International Biodegradation Symposium", J. M. Sharpley and A. M. Kaplan, Eds. Barking, England, 1976, pp. 775–784.
Stutzenberger & Kahler, *Journal of Applied Bacteriology*, 1986, 61, pp. 225–233.

Primary Examiner—Jeffrey C. Mullis
Attorney, Agent, or Firm—Betty J. Boshears; William P. Heath

[57] ABSTRACT

This invention relates to a blend comprising (a) about 2% to about 98% by weight of at least one ester of cellulose comprising an alkanoyl chain having from about 1 to about 10 carbon atoms, and having at a D.S. of about 2.3 to about 3.0, and an inherent viscosity of about 0.2 to about 3.0 deciliters/gram as measured at a temperature of 25° C. for a 0.5 g sample in 100 ml of a 60/40 parts by weight solution of phenol/tetrachloroethane, and (b) about 98% to about 2% by weight of at least one ester of cellulose comprising an alkanoyl chain having from about 1 to about 10 carbon atoms, and having a D.S. of about 1.5 to about 2.2, and an inherent viscosity of about 0.2 to about 3.0 deciliters/gram as measured at a temperature of 25° C. for a 0.5 g sample in 100 ml of a 60/40 parts by weight solution of phenol/tetrachloroethane, said percentages being based on the weight of component (a) plus component (b).

45 Claims, No Drawings 5,594,068

CELLULOSE ESTER BLENDS

This is a divisional application of application Ser. No. 08/069,246, filed May 28, 1993, now abandoned.

FIELD OF INVENTION

This invention concerns novel cellulose ester blends which are useful in the preparation of environmentally nonpersistent, dimensionally stable articles. Such dimensionally stable articles include fibers, nonwovens prepared from said fibers, films, and molded items.

BACKGROUND OF INVENTION

There continues to be interest in disposable articles and the disposal of these articles. Examples of such disposable articles include infant diapers, incontinence briefs, sanitary napkins, tampons, bed liners, bedpans, bandages, food containers, agricultural compost sheets, plastic forks, plastic knives, plastic spoons, plastic plates, foamed cups, plastic trays, garbage bags, cigarette filters, and syringes. Examples of other disposable items include razor blade handles, toothbrush handles, disposable fishing lines, fishing nets, packaging, cups, clamshells, and numerous other items. Such disposable items commonly enter the municipal solid waste stream. Due to inadequate treatment of the solid waste and the durable composition of the items, these items accumulate in landfills.

Moreover, many of these disposable items frequently are discarded and become litter items. The number of available landfills is diminishing, and the cost of solid waste disposal is on the rise.

Although such disposable items are not reusable and do not fit into the plastic recycling stream, it has become widely recognized that such items could in effect be recycled for their carbon content by composting. Composting of disposable items reduces the solid waste volume for landfilling and provides a useful product, namely humus. However, one problem with composting is the availability of compostable materials suitable for entry into such a recycling stream.

Although cellulose esters, such as cellulose acetate, are often considered to have a distinct or regular chemical structure, those skilled in the art recognize that cellulose esters are in fact copolymers whose physical properties dramatically depend upon the monomer composition of the copolymer (Buchanan, et al., *Macromolecules*, 1991, 24, 3050; Ibid., 3060; "Polymer Blends, Vol. 1", D. R. Paul and S. Newman, Academic Press, 1978.). For example, cellulose acetate is in fact a copolymer which can contain up to eight monomers (FIG. 1) while a cellulose mixed ester such as cellulose acetate propionate, is a copolymer which can contain up to 27 monomers.

Miscible polymer blends, often called alloys, are homogeneous mixtures of two or more polymers. Miscible polymer blends typically are optically clear resins having a single composition-dependent glass transition temperature. Miscible blends can be viewed as a subset of compatible blends which results when two materials are combined to give a resin with beneficial properties.

Blends of two or more cellulose esters are generally unknown and believed to be incompatible with little useful properties.

Known examples of blends of two different cellulose esters having a similar degree of substitution but with different types of substituents comes principally from the work of Petersen, et al. (*Polym. Prepr. Am. Chem. Soc. Div. Polym. Chem.* 1969, 10, 385) who reported that cellulose acetate (CA)/cellulose acetate propionate (CAP), CA/cellulose acetate butyrate (CAB), and CAP/CAB blends are incompatible (i.e., phase separated in solution or gave-a film that was not clear). Kashdan U.S. Pat. No. 4,795,641 discloses that immiscible blends of cellulose acetate and cellulose mixed esters for the controlled release delivery of bioactive agents.

Known examples of blends of two different cellulose esters having similar substituents but having two different degrees of substitution (DS, "DS" refers to the number of substituents per anhydroglucose unit where the maximum DS is three) are equally limited. Slonimskii (*J. Polym. Sci.*, 1958, 30, 625) discloses that blends of cellulose acetate I (DS ca. 3) and cellulose acetate II (DS ca. 2.5) are incompatible (i.e., phase separated in solution). Friese in unpublished work ("Polymer Blends, Vol. 1", D. R. Paul and S. Newman, Academic Press, 1978) suggests that films prepared from cellulose triacetate (DS=3) and cellulose diacetate (DS ca. 2.5) are compatible when cast from ethylene chlorohydrin solutions but incompatible when cast from 1/1 $CHCl_3$/acetone. Therefore, this previous work suggests that the films cast from ethylene chlorohydrin still retain solvent.

Some miscible blends of a cellulose ester and another polymer are known in the art. U.S. Pat. No. 3,781,381 discloses that blends, formed by solution casting of polycaprolactone and a cellulose ester mixture, are miscible. Hubbell and Cooper in *J. Appl. Polym. Sci.*, 1977, 21, 3035, demonstrated that cellulose acetate butyrate/polycaprolactone blends are in fact immiscible.

U.S. Pat. No. 3,668,157 discloses that block copolymers of polyether-polyesters form miscible blends with some cellulose esters. The use of an elastomeric block copolymer was reported to be critical. U.S. Pat. No. 3,668,157 also discloses that the corresponding homopolymeric elastomers were incompatible with cellulose esters.

U.S. Pat. No. 4,506,045 discloses that polyester-carbonates and polyether-carbonates copolymers form miscible blends with many cellulose esters and are useful as thermoplastic resins.

U.S. Pat. No. 4,533,397 discloses that contact lenses can be prepared from blends consisting of (A) 97–70% by weight of cellulose esters and (B) 3–30% by weight of an aliphatic polymeric compound having ester moieties, carbonate moieties, or both ester and carbonate moieties in the same polymer chain. The disclosure in U.S. Pat. No. 4,533,397 is limited to aliphatic polymeric compounds; no reference is made to random copolymers consisting of aliphatic diacids, aromatic diacids, and suitable diols or polyols. The disclosure in U.S. Pat. No. 4,533,397 is further limited to cellulose mixed esters having a weight per cent hydroxyl of 1.2% to 1.95% ($DS_{OH}$=0.11–0.19). It is also limited to binary miscible blends and to the composition range of the blends (3–30 weight % aliphatic polymeric compound).

The disclosures of Scandola (*Macromolecules*, 25, p. 6441 (1992)) and Buchanan (*Macromolecules*, 25, p. 7373 (1992)) concerns miscible blends of cellulose esters with poly(hydroxybutyrate) or poly(hydroxy butyrate-co-valerate). Immiscible blends of cellulose esters and aromatic polyesters have also been disclosed in U.S. Pat. No. 4,770, 931 which are useful in applications such as paper substitutes.

SUMMARY OF THE INVENTION

The present invention concerns blends of cellulose esters containing cellulose esters having a high degree of substitution (DS) combined with other cellulose esters having an intermediate degree of substitution. The present invention also concerns dimensionally stable shaped articles prepared from the cellulose ester blends. More particularly, the present invention relates to blends comprising:

(a) about 2% to 98% by weight of one or more $C_1$–$C_{10}$ ester of cellulose having a high D.S. of about 2.3 to 3.0 and an inherent viscosity of about 0.2 to about 3.0 deciliters/gram as measured at a temperature of 25° C. for a 0.5 g sample in 100 ml of a 60/40 parts by weight solution of phenol/tetrachloroethane, and (b) about 98% to 2% by weight of one or more $C_1$–$C_{10}$ ester of cellulose having an intermediate D.S. of about 1.5 to 2.2 and an inherent viscosity of about 0.2 to about 3.0 deciliters/gram as measured at a temperature of 25° C. for a 0.5 g sample in 100 ml of a 60/40 parts by weight solution of phenol/tetrachloroethane, said percentages being based on the weight of component (a) plus component (b).

Furthermore, the present invention also relates to a blend of (c) about 4% to 97% by weight of one or more $C_1$–$C_{10}$ ester of cellulose having a high D.S. of about 2.3 to 3.0 and an inherent viscosity of about 0.2 to about 3.0 deciliters/gram as measured at a temperature of 25° C. for a 0.5 g sample in 100 ml of a 60/40 parts by weight solution of phenol/tetrachloroethane, (d) about 2% to 95% by weight of one or more $C_1$–$C_{10}$ ester of cellulose having an intermediate D.S. of about 1.5 to 2.2 and an inherent viscosity of about 0.2 to about 3.0 deciliters/gram as measured at a temperature of 25° C. for a 0.5 g sample in 100 ml of a 60/40 parts by weight solution of phenol/tetrachloroethane, and (e) about 1% to 94% of one or more aliphatic polyesters or aliphatic-aromatic polyesters, said percentages being based on the weight of component (c) plus component (d) plus component (e);

The invention is also related to dimensionally stable shaped articles prepared from the blends of the invention.

One objective of this invention is to provide a composition of matter which can be used in the construction of disposable items which will degrade under appropriate conditions such as those typically found in municipal composting facilities.

Another objective of this invention is the use of the cellulose ester blends of the invention in the preparation of dimensionally stable articles including fibers, nonwovens, films, and molded items.

Still another objective of the invention is to provide cellulose ester blends with low material and manufacturing costs while still maintaining physical properties commonly associated with cellulose esters.

The advantages of this invention include a high degree of compatibility and, in many instances, miscibility.

DETAILED DESCRIPTION OF THE INVENTION

This invention relates to blends of cellulose esters having a high degree of substitution with other cellulose esters having an intermediate degree of substitution. The blends of the invention can also be combined with aliphatic polyester and/or aliphatic-aromatic polyesters to form cellulose ester/cellulose ester/polyester blends with unique and/or enhanced physical properties. These enhanced physical properties include biodegradation and easier thermal processing conditions as compared with blends which do not include two or more cellulose esters. These blends are particularly useful as dimensionally stable, shaped articles, especially in applications where the shaped article is used as a disposable item.

By blending cellulose esters with a high D.S. with cellulose esters with an intermediate D.S., significantly lower manufacturing costs are obtained relative to using a cellulose ester with an intermediate D.S. alone without a significant reduction in biodegradation rates. This is due to the higher manufacturing costs of intermediate D.S. cellulose esters relative to high D.S. cellulose esters. The higher manufacturing costs are due to longer reaction times, more difficult product isolation and more costly recovery of carboxylic acid by-products.

Studies have demonstrated that cellulose or cellulose derivatives with a low degree of substitution, i.e., less than one, are biodegradable. As used herein, the term biodegradable is reserved for that type of degradability which is brought about by microorganisms and/or their enzymes when a substrate is exposed to said microorganisms under conditions which promote assimilation of the substrate by the microorganisms. Cellulose is degraded in the environment by both anaerobic or aerobic microorganisms. Typical endproducts of this microbial degradation include cell biomass, methane (anaerobic only), carbon dioxide, water, and other fermentation products. The ultimate endproducts will depend upon the type of environment as well as the type of microbial population that is present. However, it has been reported that cellulose esters with a D.S. greater than about one are completely resistant to attack by microorganisms. For example, Stutzenberger and Kahler (*J. Appl. Bacteriology*, 1986, 66, 225) have reported that cellulose acetate is extremely recalcitrant to attack by *Thermomonospora curvata*. However, more recently Buchanan, et al., (*J. Polym. Sci.*, 1993, 47, 1709) have shown that cellulose acetate having a D.S. as high as 2.5 can in fact be degraded by certain microorganism but that the rate at which the cellulose acetate degrades depends highly upon the D.S. Hence, a composition of matter which incorporates a lower D.S. cellulose ester will exhibit an enhanced rate of biodegradation.

Polyesters prepared from aliphatic diacids or the corresponding carboxylic ester of lower alcohols and diols have also been reported to be biodegradable. For example, Fields and Rodriguez ("Proceedings of the Third International Biodegradation Symposium", J. M. Sharpley and A. M. Kaplan, Eds., Applied Science, Barking, England, 1976, p. 775) prepared polyesters from $C_2$–$C_{12}$ diacids coupled with $C_4$–$C_{12}$ diols and found that many were biodegradable.

The cellulose esters of the present invention generally comprise repeating units of the structure:

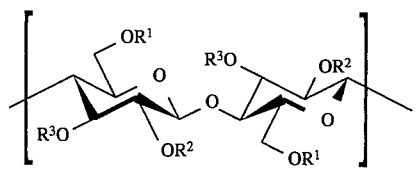

wherein $R^1$, $R^2$, and $R^3$ are selected independently from the group consisting of hydrogen or straight chain alkanoyl having from 2 to 10 carbon atoms.

The cellulose esters of the invention include cellulose acetate, cellulose acetate propionate, and cellulose acetate butyrate. These cellulose esters are described in U.S. Pat. Nos. 1,698,049; 1,683,347; 1,880,808; 1,880,560; 1,984, 147, 2,129,052; and 3,617,201, incorporated herein by reference in their entirety.

The cellulose esters useful in the present invention can be prepared using techniques known in the art or are commercially available from Eastman Chemical Company, Inc., Kingsport, Tenn., U.S.A.

The cellulose esters useful in the present invention have at least 2 anhydroglucose rings and typically have between 2 and 5,000 anhydroglucose rings; also, such polymers typically have an inherent viscosity (I.V.) of about 0.2 to about 3.0 deciliters/gram, preferably about 1 to about 1.6, as measured at a temperature of 25° C. for a 0.5 gram sample in 100 ml of a 60/40 by weight solution of phenol/tetrachloroethane.

Preferred esters of cellulose include cellulose acetate (CA), cellulose propionate (CP), cellulose butyrate (CB), cellulose acetate propionate (CAP), cellulose acetate butyrate (CAB), cellulose propionate butyrate (CPB), and the like.

The preferred cellulose esters having a high degree of substitution, hereafter referred to as CE-H, include cellulose acetates, cellulose acetate propionates and cellulose acetate butyrate having a DS of about 3.0 to about 2.3. A preferred CE-H is cellulose acetate having a DS of 2.6 to 2.4 and an I.V. of 1.1 to 1.5. Another preferred CE-H is CAP having a DS of 2.75 to 2.45 in which acetyl comprises 1–90% of the acyl substituents. A more preferred CE-H is CAP having a DS of 2.75 to 2.45 in which acetyl comprises 50–90% of the acyl substituents. Still another preferred CE-H is CAB having a DS of 2.75 to 2.45 in which acetyl comprises 1–90% of the acyl substituents. A more preferred CE-H is CAB having a DS of 2.75 to 2.45 in which acetyl comprises 50–90% of the acyl substituents.

The preferred cellulose esters having an intermediate degree of substitution, hereafter referred to as CE-L, include cellulose acetates, cellulose acetate propionates and cellulose acetate butyrates having a DS of about 2.2 to about 1.5. A preferred CE-L is cellulose acetate having a DS of 2.1 to 1.7 and an IV of 1.1 to 1.5. Another preferred CE-L is CAP having a DS of 2.2 to 1.5 in which acetyl comprises 1–90% of the acyl substituents. A more preferred CE-L is CAP having a DS of 2.1 to 1.7 in which acetyl comprises 50–90% of the acyl substituents. Still another preferred CE-L is CAB having a DS of 2.2 to 1.5 in which acetyl comprises 1–90% of the acyl substituents. A more preferred CE-L is CAB having a DS of 2.1 to 1.7 in which acetyl comprises 50–90% of the acyl substituents.

The aliphatic-aromatic copolyesters that are useful in blends in the present invention are random copolymers and preferably comprise repeating units of:

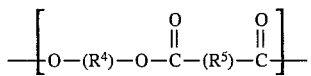

and

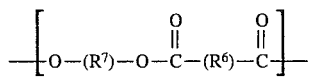

wherein $R^4$ and $R^7$ are selected from one or more of the following groups consisting of $C_2$–$C_{12}$ alkylene or oxyalkylene; $C_2$–$C_{12}$ alkylene or oxyalkylene substituents independently selected from the group consisting of halo, $C_6$–$C_{10}$ aryl, and $C_1$–$C_4$ alkoxy; cycloalkylene having 5 to 10 carbon atoms; $C_5$–$C_{10}$ cycloalkylene substituted with one to four substituents independently selected from the group consisting of halo, $C_6$–$C_{10}$ aryl, and $C_1$–$C_4$; $R^5$ is selected from one or more of the following groups consisting of $C_0$–$C_{12}$ alkylene; $C_2$–$C_{12}$ oxyalkylene; $C_1$–$C_{12}$ alkylene substituted with one to four substituents independently selected from the group consisting of halo, $C_6$–$C_{10}$ aryl, and $C_1$–$C_4$ alkoxy; $C_5$–$C_{10}$ cycloalkylene; and $C_5$–$C_{10}$ cycloalkylene substituted with one to four substituents independently selected from the group consisting of halo, $C_6$–$C_{10}$ aryl, and $C_1$–$C_4$ alkoxy; $R^6$ is selected from one or more of the following groups consisting of $C_6$–$C_{10}$ aryl, $C_6$–$C_{10}$ aryl substituted with one to four substituents independently selected from the group consisting of halo, $C_1$–$C_4$ alkyl, sulfonate and $C_1$–$C_4$ alkoxy.

It is preferred that said aliphatic-aromatic copolyester comprises 10 to 1,000 repeating units. It is more preferred that said aliphatic-aromatic copolyester comprises 15 to 600 repeating units.

For the compositions of aliphatic-aromatic copolyesters of the invention, the sum of $R^4$ and $R^7$, the part derived from diols, and the sum of $R^5$ and $R^6$, usually derived from diacids or diesters, will each be 100%.

In the present invention, the mole % of $R^5$ in the copolymer can range from about 30 to 97%, and the mole % of $R^6$ can range from about 3 to 70%. A more preferred range is when the mole % of $R^5$ is from about 45 to 85% and the mole % of $R^6$ is from about 15–55 %. The most preferred ranges, in general, depend upon the needed level of miscibility of the copolyester with the cellulose esters and the physical properties desired. The most preferred ranges for miscible blends is when $R^5$ is glutaric and the mole % of $R^5$ in the copolyester ranges from 70 to 85% and the mole % of $R^6$ range from 15–30 mole %. The most preferred ranges for partially miscible blends is when $R^5$ is glutaric and the mole % of $R^5$ in the copolyester ranges from 45 to 60% and the mole of $R^6$ ranges from 40–55%.

As used herein the terms "alkyl" and "alkylene" refer to either straight or branched chain moieties such as —CH$_2$—CH$_2$—CH$_2$—CH$_2$— and —CH$_2$CH(X)—CH$_2$—. Also, all of the carbon atoms of the cycloalkyl and cycloalkylene moieties are not necessarily in the ring structure, e.g., a cycloalkyl having 8 carbon atoms group can be cyclooctyl or dimethylcyclohexyl. The term "oxyalkylene" refers to alkylene chains containing 1 to 4 ether oxygen groups.

One type of aliphatic polyester useful in the present invention preferably comprises repeating units of:

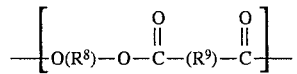

wherein $R^8$ is selected from one or more of the following groups consisting of C2–C12 alkylene or oxyalkylene; C2–C12 alkylene or oxyalkylene substituted with one to four substituents independently selected from the group consisting of halo, C6–C10 aryl, and C1–C4 alkoxy; C5–C10 cycloalkylene; C5–C10 cycloalkylene substituted with one to four substituents independently selected from the group consisting of halo, C6–C10 aryl, and C1–C4 alkoxy; $R^9$ is selected from one or more of the following groups consisting of C0–C12 alkylene or oxyalkylene; C1–C12 alkylene substituted with one to four substituents independently selected from the group consisting of halo, C6–C10 aryl, and C1–C4 alkoxy; C5–C10 cycloalkylene; and C5–C10 cycloalkylene substituted with one to four substituents independently selected from the group consisting of halo, C6–C10 aryl, and C1–C4 alkoxy. The terms "alkyl" and "alkylene" are as defined above.

A second type of aliphatic polyester is polyhyroxy-alkanoates which are comprised of repeat units of the following structure:

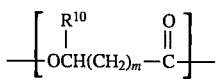

$$\left[ \begin{array}{c} R^{10} \quad\quad O \\ | \quad\quad\quad || \\ OCH(CH_2)_m-C \end{array} \right]$$

wherein m is an integer or 0 to 10, and $R^{10}$ is selected from the group consisting of hydrogen; C1–C12 alkyl; C1–C12 alkyl substituted with one to four substituents independently selected from the group consisting of halo, C6–C10 aryl, and C1–C4 alkoxy; C5–C10 cycloalkyl; and C5–C10 cycloalkyl substituted with one to four substituents independently selected from the group consisting of halo, C6–C10 aryl, and C1–C4 alkoxy.

For the purposes of this invention, aliphatic polyester is defined as an aliphatic polyester which does not contain significant quantities of carbonate linkages. Furthermore, polyester is defined as a polyester prepared by a condensation process, a ring-opening process, or by a biological process.

The preparation of polyesters and copolyesters is well known in the art (U.S. Pat. No. 2,012,267, incorporated herein by reference in its entirety). Such reactions are usually carried out at temperatures from 150° C. to 300° C. in the presence of polycondensation catalysts such as titanium tetrachloride, manganese diacetate, antimony oxide, dibutyl tin diacetate, zinc chloride, or combinations thereof. The catalysts are typically employed in amounts between 10 to 1000 ppm, based on total weight of the reactants. For the purpose of the present invention, a representative aliphatic polyester is the polycondensation product of dimethylglutarate and 1,6-hexanediol. This polyester, poly-(hexamethylene glutarate), is produced when dimethylglutarate and 1,6-hexanediol are heated at approximately 210° C. for 4 hours and then at 260° C. for 1.5 hours under vacuum in the presence of 100 ppm of Ti. A representative aliphatic-aromatic copolyester is poly(tetramethylene glutarate-co-terephthalate) containing 30 mole per cent terephthalate. This polyester is produced when dimethylglutarate, dimethyl terephthalate, and 1,4-butanediol are heated at 200° C. for 1 hour then at 245° C. for 0.9 hour under vacuum in the presence of 100 ppm of Ti present initially as $Ti(OiPr)_4$.

It is preferred that said aliphatic-aromatic copolyester for use in blending is prepared from any polyester-forming combination of dicarboxylic acids or derivatives thereof, and diols. Said dicarboxylic acids are selected from the group consisting of the following diacids: oxalic, malonic, succinic, glutaric, adipic, pimelic, azelaic, sebacic, fumaric, 2,2-dimethyl glutaric, suberic, 1,3-cyclo-pentanedicarboxylic, 1,4-cyclohexanedicarboxylic, 1,3-cyclohexanedicarboxylic, diglycolic, itaconic, maleic, 2,5-norbornanedicarboxylic, 1,4-terephthalic, 1,3-terephthalic, 2,6-naphthoic, 1,5-naphthoic, and ester forming derivatives thereof, and combinations thereof; and said diols are selected from the group consisting of ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, tetraethylene glycol, and combinations thereof.

Preferred aliphatic-aromatic polyesters for blending with CAP-H/CAP-L or CAB-H/CAB-L blends are poly(tetramethylene glutarate-co-terephthalate), poly(tetramethylene adipate-co-terephthalate), poly(ethylene glutarate-co-terephthalate), and poly(ethylene adipate-co-terephthalate) where the mole % of aromatic dicarboxylate can vary from 10–60 mole percent. The preferred polyesters for blending with CAP-H/CAP-L or CAB-H/CAB-L blends consist of glutaric or adipic dicarboxylates and ethylene glycol, trimethylene glycol, or tetramethylene glycol. Specific examples include poly(tetramethylene glutarate), poly(ethylene glutarate), poly(tetramethylene adipate), and poly(ethylene adipate). Preferred aliphatic-aromatic polyesters for blending with CA-H/CA-L blends are poly(ethylene glutarate-co-5-sulfoisophthalate) where the mole % of aromatic dicarboxylate can vary from 3–12 mole percent. Preferred aliphatic polyesters for blending with CA-H/CA-L blends are aliphatic copolyesters consisting of succinic dicarboxylate and two or more diols selected from ethylene glycol, tetramethylene glycol, or diethylene glycol. Specific examples include poly(ethylene-co-tetramethylene succinate) where the mol % of tetramethylene glycol varies from 15–25% and poly(ethylene-co-diethylene succinate) where the mol % of diethylene glycol varies from 10–25%.

For blends of CE-H (component (a)) and CE-L (component (b)), a preferred blend composition is when CE-H ranges from 10 weight % to 50 weight % and CE-L ranges from 90 weight % to 50 weight %. A more preferred composition is when the blend consists of 20 weight % to 35 weight % CE-H and from 80 weight % to 65 weight % CE-L.

For blends of CE-H (component (c)), CE-L (component (d)), and polyester (component e)), a preferred composition is when the blend consists of 6 weight % to 30 weight % CE-H (component (c)), 84 weight to 30 weight % CE-L (component (d)), and 40 weight % to 10 weight % polyester (component (e)). A more preferred composition is when the blend consists of 15 weight % to 30 weight % CE-H (component (c)), 75 weight % to 50 weight % CE-L (component (d)), and 20 weight % to 10 weight % polyester (IIC).

Any of the blends of this invention can optionally additionally comprise 0.001 to 50 weight per cent, based on the total weight of the composition, of one or more additional additives selected from a plasticizer, a thermal stabilizer, an antioxidant, a pro-oxidant, an acid scavenger, an ultraviolet light stabilizer, a promoter of photodegradation, inorganics, hydrophilic additives, hydrophobic additives, and colorants. Typical plasticizers include citrates, adipates, phosphates, glycols, and phthalates. Representative inorganics include talc, $TiO_2$, $CaCO_3$, $NH_4Cl$, and silica. Colorants can be monomeric, oligomeric, and polymeric. Preferred polymeric colorants are aliphatic polyesters, aliphatic-aromatic copolyesters, or aromatic polyesters in which the color producing monomer, i.e., a dye, is covalently incorporated into the polymer. Such representative polymeric colorants are described by Weaver et al., in U.S. Pat. Nos. 4,892,922, 4,892,923, 4,882,412, 4,845,188, 4,826,903, and 4,749,773 and are incorporated herein by reference in their entirety. These polymeric dyes are represented by poly(tetramethylene terephthalate) containing 10% 1,5-bis(O-carboxyanilino) anthraquinone.

The blends of this invention can be formed into a shaped article either by a solvent casting process or by a thermal process. Examples of a solvent process include spinning of fibers or casting of film from the appropriate solvent (e.g., acetone, THF, $CH_2Cl_2$/MeOH, $CHCl_3$, dioxane, DMF, DMSO, AcOMe, AcOEt, pyridine). In a solvent process, the choice of solvent depends upon the blend composition. For example, the preferred solvent for a cellulose acetate blend where the CE-H is a CA having a DS of 2.5 and the CE-L is a CA having a DS of 2.0 is acetone containing 9–15% water.

In the thermal process, it is preferred that the blend have a melt temperature of 120° C. to 250° C. A more preferred melt temperature is from about 160° C. to 220° C. Examples of suitable plasticizers for use in a thermal process include, but are not limited to, dimethyl phthalate, triethyl citrate, trimethyl citrate, tripropyl citrate, tributyl citrate, trihexyl citrate, diethyl phthalate, dipropyl phthalate, dibutyl phthalate, triacetin, dihexyl adipate, polyethylene glycol-400, dioctyl adipate, or mixtures thereof. Preferred plasticizers are polyethylene glycol-400, triethylcitrate, diethyl phthalate, or dioctyl adipate. We have found that in the practice of this invention that it is particularly desirable to have additives which can serve dual functions. In this context, plasticizers such as polyethylene glycol-400 are preferred for the practice of this invention as they can both serve as plasticizers and as an additive that is particularly useful in modifying the surface or bulk water content of the blend.

In the thermal process, the blend components can be mixed by thermally compounding. The most preferred method is by thermally compounding in an apparatus such as a torque rheometer, a single screw extruder, or a twin screw extruder. The blends produced by thermally compounding can be converted to thin films by a number of methods known to those skilled in the art. For example, thin films can be formed by dipcoating as described in U.S. Pat. No. 4,372,311, by compression molding as described in U.S. Pat. No. 4,427,614, by melt extrusion as described in U.S. Pat. No. 4,880,592, by melt blowing, or by other similar methods. The blends can be converted to molded plastic objects by injection molding as well as by extrusion into a sheet from which an object is cut or stamped. The thermally compounded blends can be used for melt extrusion of fiber are can be blow molded into bottles as well.

The cellulose ester blends can also be premixed by coprecipitation from a common solvent. Blends isolated by coprecipitation can then be thermally or solvent processed as described above. In the thermal process, plasticizers and other additives can be added as previously described. Polyesters and other additives can be added to the coprecipitated blend by the thermal process to form the ternary blends of (II). Preferred solvents for coprecipitation include acetone, acetone/ water, propionic acid, acetic acid, or butyric acid. Particularly preferred is mixing of the cellulose ester reaction mixtures at the end of preparation of the cellulose esters followed by coprecipitation.

The blends of this invention can be used to prepare shaped articles such as films, fibers, bottles, etc., which are dimensionally stable and which are especially useful in disposable items.

The blends of this invention are useful in packaging applications where thin films are desirable. Many of the blends of this invention are particularly useful as thin barrier films where they must function as a barrier and/or be biodegradable. For example, these resins are useful as protective barrier films and may be used in disposable absorbent articles such as infant diapers, incontinence briefs, sanitary napkins, tampons, bed liners, bedpan liners, bandages, and the like.

It is preferred that the films of the invention have a tangent modulus of $2.5 \times 10^5$ psi to $0.01 \times 10^5$ psi, a tensile strength of at least about $0.5 \times 10^3$ psi, an average tear force of at least about 7.0 g/mil, and an elongation at break of at least about 10%. Also preferred is wherein said films have a thickness of about 0.1 mil to about 20 mil and a water vapor transmission rate less than about 2000 g mil/m$^2$-24 hours.

The blends of this invention can also be used in the other parts of disposable diapers. In addition to being used as a protective barrier film, these blends can be used as tabs, nonwovens, fibers, tape, and other parts needed in the construction of a diaper.

The blends of this invention are also useful as molded plastic parts or as solid, foamed plastic objects. Examples of such parts include disposable knives, forks, spoons, plates, cups, straws as well as eyeglass frames, toothbrush handles, toys, automotive trim, tool handles, camera parts, razor parts, ink pen barrels, disposable syringes, bottles, and the like. The plastic parts, especially those made by a foamed method which gives the plastic part increased surface area, of this invention are particularly useful in applications were it is desired that the plastic part be environmentally non-persistent. Injection molding bars made from the resins of the invention typically have a flexural modulus of $5.0 \times 10^5$ psi to $0.1 \times 10^5$ psi, a flexural strength of $13 \times 10^3$ psi to $0.1 \times 10^3$ psi, and a notched Izod (23° C.) of 1.0 to 25 ft-lb/in. It is preferred that the molding bars have a flexural modulus of $3.8 \times 10^5$ psi to $1.5 \times 10^5$ psi, a flexural strength of $11.4 \times 10^3$ psi to $4 \times 10^3$ psi, and a notched Izod (23° C.) of 2 to 15 ft-lb/in.

The blends of this invention are also useful as fibers. Examples of fiber applications include cigarette filters, diaper topsheet, sanitary napkins, fishing line, fishing nets, fiber for producing surgical clothing, hygiene articles, absorbent fibers, fibers for conveying liquids, and the like. We have found that the many of the resins of this invention can be melt-spun to produce fibers with excellent strength. The fibers can be oriented by drawing the fiber after spinning or by orientation during the spinning (cabinet orientation). Fibers produced from the blends have excellent shape retention even for fibers with complex cross-sectional shapes. We have also found that the fibers can be readily crimped. Fiber produced from the resins typically have a denier/filament (DPF) of 30–0.1. The preferred DPF is 10–1.5.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise described. All percentages are by weight unless otherwise described.

EXAMPLES

Abbreviations used herein are as follows: "DSC" is differential scanning calorimetry; "g" is gram; "psi" is pounds per square inch; "cc" is cubic centimeter; "m" is meter; "rpm" is revolutions per minute; "vol." or "v" is volume; "wt." is weight; "mm" is micrometer; "CE" is cellulose ester; "mil" is 0.001 inch. Relative to naming of the cellulose ester, "CA-L" is cellulose acetate having an intermediate degree of substitution; "CA-H" is cellulose acetate having a high degree of substitution; "CA" is cellulose acetate and "CAP" is cellulose acetate propionate. Other abbreviations are: "PEG400" is poly(ethylene glycol) with a MW of about 400, "PE" is polyester; "DOA" is dioctyl adipate. Relative to naming of the polyester, representative examples are: "PES" is poly(ethylene succinate); "PEG" is poly(ethylene glutarate); "PTG" is poly(tetra-methylene glutarate).

The DSC spectra were collected using a Du Pont 912 Differential Scanning Calorimeter Spectrometer. The sample was heated from room temperature to 135° C. at a heating rate of 20° min$^{-1}$ and held for 30 seconds before cooling rapidly to 0° C. Second scan heating curves were then collected by heating from 0° C. to 275° C. at 20° min⁻¹. After cooling rapidly, third scan heating curves were then collected by heating from 0° C. to 275° C. at 20° min⁻¹.

The tensile strength, elongation at break, and tangent modulus of the films are measured by ASTM method D882; the tear force is measured by ASTM method D1938. The tensile strength and elongation at break for molded pieces are measured by ASTM method D638; the flexural strength and modulus by ASTM method D790; the Izod impact strength by ASTM method D256.

Thermal Compounding. In the following examples, the blends prepared by the thermal method were prepared by the following general methods:

(i) the components are shaken together before compounding at the appropriate temperature in a Rheometrics Mechanical Spectrometer. The resulting resin is typically ground to 5 mm particle size;

(ii) ternary blends were prepared by compounding on a 30 mm Werner-Pfliderer twin screw extruder. The typical procedure is as follows: Separate feed systems, one each for the cellulose esters and one for the polyester are utilized for this method of melt blending. Alternatively, the cellulose esters can be premixed either by coprecipitation, by tumbling, or in an apparatus such as a Henschel mixer. The cellulose esters are generally added as a dry powders while the polyester(s) are added as a viscous liquid(s). The cellulose esters are added at the desired rate using an AccuRate feeder through a hopper into the barrel of the extruder. The polyester(s) are pre-heated under nitrogen and are poured into a heated feed tank. The polyester(s) are maintained under a nitrogen atmosphere and gravity fed through a stainless steel line to a gear pump which transfers the molten material through a stainless steel line (½ inch outer diameter) into the barrel of the extruder. All lines for this feed system are heated and insulated. The production rate of the extruder is in the range of 10–50 pounds/hr. The zone temperatures are set depending on the exact nature of the polyesters and the cellulose esters and generally will vary in the range of about 100° C. to 250° C. Afterwards, the two strands of material exiting the extruder are quenched in water and chopped with a CONAIR JETRO pelletizer.

(iii) Blends of the cellulose esters and polyesters are prepared by compounding on a 30 mm Werner-Pfliderer twin screw extruder. The typical procedure is as follows: A single feed system is utilized for this method of melt blending. The cellulose esters and the polyester(s) are dry blended and added as a solid in Zone 1. The dry blend is added at the desired rate using an AccuRate feeder through a hopper into the barrel of the extruder. The production rate of the extruder is in the range of 10–50 pounds/hr. The zone temperatures are set depending on the exact nature of the polyester and the cellulose ester and generally vary in the range of about 100° C. to 250° C. Afterwards, the two strands of material exiting the extruder are quenched in water and chopped with a CONAIR JETRO pelletizer.

(iv) Blends of two or more cellulose esters are prepared by compounding on a 30 mm Werner-Pfliderer twin screw extruder. The typical procedure is as follows: A single feed system was utilized for this method of melt blending. The cellulose esters are dry blended with or without plasticizer and added as a solid in Zone 1. Alternatively, the cellulose esters can be premixed by coprecipitation. The dry blend is added at the desired rate using an AccuRate feeder through a hopper into the barrel of the extruder. Plasticizer can be added via a second feed system. The production rate of the extruder is in the range of 10–50 pounds/hr. The zone temperatures are set depending on the exact nature of the cellulose esters and generally vary in the range of about 100° C. to 250° C. Afterwards, the two strands of material exiting the extruder are quenched in water and chopped with a CONAIR JETRO pelletizer.

(v) Blends of two or more cellulose esters are prepared by compounding on a 30 mm Werner-Pfliderer twin screw extruder. The typical procedure is as follows: Separate feed systems, one each of the cellulose esters and one for the plasticizer were utilized for this method of melt blending. The cellulose esters are added at the desired rate using an AccuRate feeder through a hopper into the barrel of the extruder. The production rate of the extruder is in the range of 10–50 pounds/hr. The zone temperatures are set depending on the exact nature of the cellulose esters and generally vary in the range of about 100° C. to 250° C. Afterwards, the two strands of material exiting the extruder were quenched in water and chopped with a CONAIR JETRO pelletizer.

Dimensionally stable shaped articles were typically formed by either injection molding or by compression film molding. For injection molding, a Toyo 90 injection molding machine was utilized; the exact processing conditions depended upon the blend that was molded. For compression film molding, a portion of the resin is pressed between two metal plates at a temperature above the melt temperature of the blend to form a melt pressed film.

EXAMPLE 1

Melt pressed films were prepared from blends of cellulose acetate of high degree (CA-H) and intermediate (CA-L) of substitution using polyethylene glycol-400 as a plasticizer according to general thermal method (i). This example illustrates the useful properties of these blends and demonstrates how a range of unexpectedly useful properties can be obtained by proper selection of the blend components. For example, a range of modulus from 2.4 to 1.3 is available without having to alter the plasticizer content and, even though the (CA-H) is the low modulus blend component, the softest film (low modulus) occurs when the blend composition is 50/50 CA-L/CA-H. Such a composition will degrade more rapidly than a 100% (CA-H).

| | Blends of CA—L (DS = 2.05)/CA—H (DS = 2.5) Containing 24% PEG400 as Plasticizer | | | | | |
|---|---|---|---|---|---|---|
| Blend CA—L/CA—H | Yield Stress | Break Stress | Elongation at Elong. (%) | Tangent Modulus | Tensile Strength | Tear Strength (g/mil) |
| 99/1 | 4.26 | 3.85 | 9 | 2.38 | 4.26 | 14.0 |
| 98/2 | 4.19 | 3.85 | 13 | 2.17 | 4.19 | 14.6 |

-continued

Blends of CA—L (DS = 2.05)/CA—H (DS = 2.5)
Containing 24% PEG400 as Plasticizer

| Blend CA—L/CA—H | Yield Stress | Break Stress | Elongation at Elong. (%) | Tangent Modulus | Tensile Strength | Tear Strength (g/mil) |
|---|---|---|---|---|---|---|
| 95/5 | 4.26 | 3.85 | 7 | 2.43 | 4.26 | 12.7 |
| 90/10 | 3.63 | 3.40 | 4 | 2.17 | 3.63 | 14.3 |
| 75/25 | 4.15 | 3.91 | 10 | 2.29 | 4.16 | 15.6 |
| 50/50 | 2.06 | 1.17 | 7 | 1.34 | 2.06 | 17.0 |
| 25/75 | 2.74 | 2.11 | 10 | 1.73 | 2.74 | 14.4 |
| 10/90 | 3.45 | 2.20 | 6 | 1.70 | 3.45 | 13.1 |
| 5/95 | 2.51 | 2.40 | 10 | 1.46 | 2.76 | 20.0 |
| 2/98 | 2.62 | 2.16 | 6 | 1.59 | 2.62 | 17.1 |
| 1/99 | 3.18 | 2.35 | 6 | 1.68 | 3.18 | 16.4 |

EXAMPLE 2

This example demonstrates that shaped articles with dimensional stability can be made from these blends using the standard injection molding process and that resins with a wide range of properties can be obtained by proper selection of the blend ratio. For example, the 50/50 blend has a combination of unexpected high impact strength and low flexural modulus. Each of these blends consisted of cellulose acetate of intermediate DS (CA-L, DS=2.05) and high DS (CA-H, DS=2.5) with 24% polyethylene glycol-400 as plasticizer. The blend was prepared according to general thermal method (iv) using a processing temperature of 210° C. and a molding temperature of 210° C.

| Entry | Resin | Flexural Strength ($10^3$ psi) | Flexural Modulus ($10^5$ psi) | Tensile Strength ($10^3$ psi) | Elongation at Break % |
|---|---|---|---|---|---|
| 1 | 95/5 CA—L/CA—H | 6.90 | 2.98 | 8.26 | 16.6 |
| 2 | 75/25 CA—L/CA—H | 6.81 | 2.95 | 7.05 | 15.8 |
| 3 | 50/50 CA—L/CA—H | 3.54 | 1.67 | 3.85 | 29.7 |
| 4 | 25/75 CA—L/CA—H | 6.88 | 2.91 | 6.78 | 16.3 |
| 5 | 5/95 CA—L/CA—H | 6.27 | 2.72 | 5.44 | 19.6 |

| Entry | Resin | Izod Notched (23° C.) | Izod Unnotched (23° C.) | Izod Notched (−40° C.) | Izod Unnotched (−40° C.) |
|---|---|---|---|---|---|
| 1 | 95/5 CA—L/CA—H | 2.33 | 46.13 | 0.19 | 14.97 |
| 2 | 75/25 CA—L/CA—H | 2.29 | 44.66 | 0.21 | 19.14 |
| 3 | 50/50 CA—L/CA—H | 4.14 | 28.65 | 0.22 | 15.09 |
| 4 | 25/75 CA—L/CA—H | 2.62 | 31.52 | 0.20 | 10.98 |
| 5 | 5/95 CA—L/CA—H | 2.88 | 39.25 | 0.24 | 7.53 |

EXAMPLE 3

Composting can be defined as the microbial degradation and conversion of solid organic waste into soil. One of the key characteristics of compost piles is that they are self heating; heat is a natural by-product of the metabolic break down of organic matter. Depending upon the size of the pile, or its ability to insulate, the heat can be trapped and cause the internal temperature to rise.

In order to assess the biodegradation potential of the test films, small-scale compost units were employed to simulate the active treatment processes found in a municipal solid waste composter. These bench-scale units displayed the same key features that distinguish the large-scale municipal compost plants. The starting organic waste was formulated to be representative of that found in municipal solid waste streams: a carbon to nitrogen of 25:1 ratio, a 55% moisture content, a neutral pH, a source of readily degradable organic carbon (e.g., cellulose, protein, simple carbohydrates, and lipids), and had a particle size that allowed good air flow through the mass. Prior to being placed in a compost unit, all test films were carefully dried and weighed. Test films were mixed with the compost at the start of an experiment and incubated with the compost for 30 days. The efficiency of the bench scale compost units were determined by monitoring the temperature profiles and dry weight disappearance of the compost. These bench scale units typically reached 60°–65° C. within 8 hours. After 15 days of incubation there is typically a 40% dry weight loss in the compost. Films made from a blend consisting of cellulose acetate of 95% intermediate DS (CA-L, DS=2.05) and 5% high DS (CA-H, DS=2.5) with 24% polyethylene glycol-400 as plasticizer was composted for 30 days. In this experiment, these films completely disappeared due to biological activity in the composting unit thereby demonstrating the biodegradability of these blends.

EXAMPLE 4

A series of cellulose $1\text{-}^{14}C$-acetates prepared by the general method of Buchanan et al. (*J. Polym. Sci.*, 1993, 47, 1709). Approximately 1 mCi of the esters were individually incubated in an in vitro enrichment assay at 30° C. FIG. 2 illustrates the microbial production of $^{14}CO_2$ from labelled the $1\text{-}^{14}C$-cellulose acetates. After 15 days, approximately 82% of the original starting label for the CA with a DS of 1.85 was converted into $^{14}CO_2$ while ca 60% of the label was converted to $^{14}CO_2$ with the CA having a DS of 2.07. The labeled CA with a DS of 2.57 degraded slower; after 15 days, only ca. 40% of the label was recovered. FIG. 2 also shows that a shorter lag time is required for the 1.85 DS CA compared to the higher substituted 2.07 and 2.57 materials. This example demonstrates that many cellulose esters are inherently biodegradable; the rate at which it degrades is dependent upon factors such as DS.

EXAMPLE 5

A series of CA-L/CA-H blends (DS=2.05/DS=2.5), prepared as in example 1, were subjected to high pressure liquid chromatography (HPLC) using as the mobile phase a mixture of 50% $H_2O$/15% MeOH/35% Acetone for the first 15 minutes and a mixture of 20% MeOH/80% Acetone after 15 minutes. The flow rate was 0.8 mil/min. The results are shown in FIG. 3. This results illustrates that the CA-L and CA-H polymers are, in fact, chemically distinct copolymers.

EXAMPLE 6

A series of CA-L/CA-H blends (DS=2.05/DS=2.5) was prepared by the solvent method using a mixture of acetone/$H_2O$ as the solvent from which the films were cast. Each of these films were analyzed using DSC. The results are shown in FIG. 4. This figure shows that blends containing from about 0–25% and about 75–100% CA-L have a single composition-dependent glass transition temperature which is indicative of a miscible blend. The blends containing from about 25–75% CA-L have two glass transition temperatures intermediate between the blend component glass transition temperatures indicating that these blends are partially miscible (compatible) blends. This blend morphology for the 25–75% CA-L blends illustrated by FIG. 4, in part, imparts the unexpected physical properties found in Examples 1 and 2.

EXAMPLE 7

Melt pressed films were prepared from blends of cellulose acetate propionate of high degree (CE-H, DS/AGU=2.75) and intermediate (CE-L, DS/AGU=2.0) of substitution using poly(ethylene glutarate) as the polyester additive according to general thermal method (i). The films were optically clear and flexible. This example illustrates the useful resins obtained when aliphatic polyesters are incorporated into the cellulose ester blends.

EXAMPLE 8

Melt pressed films were prepared from blends of cellulose acetate of high degree (CE-H, DS/AGU=2.5) and intermediate (CE-L, DS/AGU=2.05) of substitution using poly(ethylene-co-tetramethylene succinate) (mol % of tetramethylene=20%) as the polyester additive according to general thermal method (i). The films were optically clear and flexible. This example illustrates the useful resins obtained when aliphatic polyesters are incorporated into the cellulose ester blends.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A compatible blend comprising
   (c) about 4% to 97% by weight of one or more $C_1$–$C_{10}$ ester of cellulose having a high D.S. of about 2.3 to 3.0 and an inherent viscosity of about 0.2 to about 3.0 deciliters/gram as measured at a temperature of 25° C.

for a 0.5 g sample in 100 ml of a 60/40 parts by weight solution of phenol/tetrachloroethane,
   (d) about 2% to 95% by weight of one or more $C_1$–$C_{10}$ ester of cellulose having an intermediate D.S. of about 1.5 to 2.2 which is lower than the D.S. of the cellulose ester of (c) and which has an inherent viscosity of about 0.2 to about 3.0 deciliters/gram as measured at a temperature of 25° C. for a 0.5 g sample in 100 ml of a 60/40 parts by weight solution of phenol/tetrachloroethane, and
   (e) about 1% to 94% of one or more aliphatic polyesters or aliphatic-aromatic polyesters,
said percentages being based on the weight of component (c) plus component (d) plus component (e).

2. The blend of claim 1 wherein said cellulose esters of components (c) and (d) comprise repeat units of the structure:

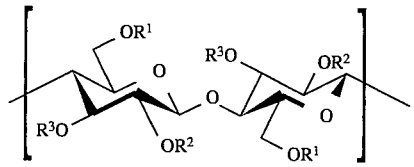

wherein $R^1$, $R^2$, and $R^3$ are selected independently from the group consisting of hydrogen or straight chain alkanoyl having from 2 to 10 carbon atoms.

3. The blend of claim 1 wherein said cellulose ester of components (c) and (d) are secondary cellulose esters.

4. The blend of claim 1 wherein said cellulose ester of component (c) are selected from the group consisting of cellulose acetate, cellulose acetate propionate and cellulose acetate butyrate.

5. The blend of claim 1 wherein said cellulose ester of component (d) are selected from the group consisting of cellulose acetate, cellulose acetate propionate and cellulose acetate butyrate.

6. The blend of claim 1 wherein said cellulose ester contain from about 2 to about 5,000 anhydroglucose rings.

7. The blend of claim 4 wherein said cellulose acetate of component (c) of claim 1 has a D.S. of 2.6 to 2.4 and an I.V. of 1.1 to 1.5.

8. The blend of claim 4 wherein said cellulose acetate propionate has a D.S. of 2.75 to 2.45 in which acetyl comprises 1–90% of the acyl substituents.

9. The blend of claim 4 wherein said cellulose acetate propionate has a D.S. of 2.75 to 2.45 in which acetyl comprises 50–90% of the acyl substituents.

10. The blend of claim 4 wherein said cellulose acetate butyrate has a D.S. of 2.75 to 2.45 in which acetyl comprises 1–90% of the acyl substituents.

11. The blend of claim 10 wherein said cellulose acetate butyrate has a D.S. of 2.75 to 2.55 in which acetyl comprises 50–90% of the acyl substituents.

12. The blend of claim 5 wherein said cellulose acetate has a D. S. of about 1.5 to 2.2.

13. The blend of claim 12 wherein said cellulose acetate has an I.V. of 1.1 to 1.5.

14. The blend of claim 5 wherein said cellulose acetate propionate has a D.S. of about 1.5 to 2.2.

15. The blend of claim 14 wherein acetyl comprises 1–90% of the acyl substituents.

16. The blend of claim 14 wherein said cellulose acetate propionate has a D.S. of about 1.7 to 2.1. in which acetyl comprising 50–90% of the acyl substituents.

17. The blend of claim 5 wherein said cellulose acetate butyrate has a D.S. of 1.5 to 2.2 in which acetyl comprises about 1 to about 90% of the acyl substituents.

18. The blend of claim 5 wherein said cellulose acetate butyrate has a D.S. of about 1.7 to 2.1 in which acetyl comprises about 50 to about 90% of the acyl substituents.

19. The blend of claim 1 wherein said aliphatic aromatic copolyester comprises repeat units of:

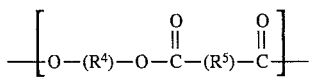

and

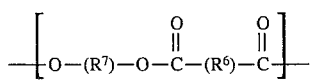

wherein $R^4$ and $R^7$ are selected from one or more of the following groups consisting of $C_2$–$C_{12}$ alkylene or oxyalkylene; $C_2$–$C_{12}$ alkylene or oxyalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; $R^5$ is selected from one or more of the following groups consisting of $C_0$–$C_{12}$ alkylene; $C_2$–$C_{12}$ oxyalkylene; $C_1$–$C_{12}$ alkylene substituted with one to four substituents independently selected from the group consisting of halo, $C_6$–$C_{10}$ aryl, and $C_1$–$C_4$ alkoxy; $C_5$–$C_{10}$ cycloalkylene; and $C_5$–$C_{10}$ cycloalkylene substituted with one to four substituents independently selected from the group consisting of halo, $C_6$–$C_{10}$ aryl, and $C_1$–$C_4$ alkoxy; $R^6$ is selected from one or more of the following groups consisting of $C_6$–$C_{10}$ aryl, $C_6$–$C_{10}$ aryl substituted with one to four substituents independently selected from the group, consisting of halo, $C_1$–$C_4$ alkyl, sulfonate, and $C_1$–$C_4$ alkoxy.

20. The blend of claim 1 wherein aliphatic-aromatic copolyester comprises 10 to 1000 repeat units.

21. The blend of claim 20 wherein aliphatic-aromatic copolyester comprises 15 to 600 repeat units.

22. The blend of claim 19 wherein $R^4$ or $R^7$ is selected from $C_2$–$C_6$ alkylene, $C_4$–$C_8$ oxyalkylene, or $C_5$–$C_{10}$ cycloalkylene and $R^5$ is selected from $C_2$–$C_6$ alkylene or $C_5$–$C_{10}$ cycloalkylene; $R^6$ is selected from $C_6$–$C_{10}$ aryl.

23. The blend of claim 28 wherein the mole % of $R^5$ in the copolymer is from about 30 to 97%, and the mole % of $R^6$ is from about 3 to 70%.

24. The blend of claim 23 wherein the mole % of $R^5$ in the copolymer is from about 45 to 85% and the mole of $R^6$ is from about 15–55%.

25. The blend of claim 19 wherein said aliphatic-aromatic copolyester is prepared from any polyester forming combination or combinations of dicarboxylic acids or derivatives thereof, and diols, said dicarboxylic acids are selected from the group consisting of the following diacids: oxalic, malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, 2,5-norbornanedicarboxylic, 1,4-terephthalic, 1,3-terephthalic, 2,6-naphthalene dicarboxylic, 1,5-naphthalene dicarboxylic, and ester forming derivatives thereof, and combinations thereof; and said diols are selected from the group consisting of ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, tetraethylene glycol, di-, tri-, tetrapropylene glycol, and combinations thereof.

26. The blend of claim 24 wherein $R^5$ is —$CH_2CH_2CH_2$— and the mole % of the $R^5$ component in the copolyester ranges from 70 to 85% and the mole % of the $R^6$ component ranges from 15–30 mole %.

27. The blend of claim 24 wherein $R^5$ is —$CH_2CH_2CH_2$— and the mole % of the $R^5$ component in the copolyester ranges from 45 to 60% and the mole % of the $R^6$ component ranges from 40–55 mole %.

28. The blend of claim 24 wherein said aliphatic-aromatic copolyester is poly(tetramethylene glutarate-co-terephthalate) containing 30 mole % terephthalate and 70 mole % glutarate.

29. The blend of claim 25 wherein said aliphatic-aromatic copolyester is selected from poly(tetramethylene glutarate-co-terephthalate-co-diglycolate), poly(tetramethylene glutarate-co-terephthalate), poly(tetra-methylene glutarate-co-terephthalate), poly(tetramethylene glutarate-co-terephthalate), poly(tetramethylene glutarate-co-terephthalate), poly(ethylene glutarate-co-terephthalate), poly-(tetramethylene adipate-co-terephthalate), poly(tetramethylene succinate-co-terephthalate), and poly(tetramethylene-co-ethylene glutarate-co-terephthalate).

30. A blend of claim 1 wherein the high D.S. cellulose ester is 6 to 30 weight %, the intermediate D.S. cellulose ester is from 84 to 30 weight %, and the polyester is from 40 to 10 weight %.

31. A blend of claim 1 wherein the high D.S. cellulose ester is 15 to 30 weight %, the intermediate D.S. cellulose ester is from 75 to 50 weight %, and the polyester is from 20 to 10 weight %.

32. The blend of claim 1 wherein said aliphatic polyester comprises repeat units of

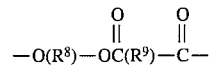

wherein $R^8$ is selected from one or more of the following groups consisting of C2–C12 alkylene or oxyalkylene; C2–C12 alkylene or oxyalkylene substituted with one to four substituents independently selected from the group consisting of halo, C6–C10 aryl, and C1–C4 alkoxy; C5–C10 cycloalkylene; C5–C10 cycloalkylene substituted with one to four substituents independently selected from the group consisting of halo, C6–C10 aryl, and C1–C4 alkoxy; $R^9$ is selected from one or more of the following groups consisting of C0–C12 alkylene or C2–C12 oxyalkylene; C1–C12 alkylene substituted with one to four substituents independently selected from the group consisting of halo, C6–C10 aryl, and C1–C4 alkoxy; C5–C10 cycloalkylene; and C5–C10 cycloalkylene substituted with one to four substituents independently selected from the group consisting of halo, C6–C10 aryl, and C1–C4 alkoxy.

33. The blend of claim 32 wherein said aliphatic polyester comprises 10 to 1,000 repeat units.

34. The blend of claim 33 wherein said aliphatic polyester comprises 15 to 600 repeat units.

35. A blend of claim 32 wherein $R^8$ is selected from $C_2$ to $C_6$ alkylene and $C_2$ to $C_8$ oxyalkylene, and $R^9$ is selected from $C_2$ to $C_6$ alkylene.

36. The blend of claim 1 wherein said aliphatic polyester comprises repeat units of

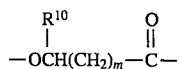

wherein m is an integer or 0 to 10, and $R^{10}$ is selected from the group consisting of hydrogen; C1–C12 alkyl; C1–C12 alkyl substituted with one to four substituents independently selected from the group consisting of halo, C6–C10 aryl, and C1–C4 alkoxy; C5–C10 cycloalkyl; and C5–C10 cycloalkyl substituted with one to four substituents independently selected from the group consisting of halo, C6–C10 aryl, and C1–C4 alkoxy.

37. The blend of claim 1 additionally comprising 0.001 to 50 weight %, based on the total weight of the composition, of at least one additional additive selected from a non-polymeric plasticizer, a thermal stabilizer, an antioxidant, a pro-oxidant, an acid scavenger, an ultraviolet light stabilizer, a promoter of photodegradation, inorganics, and colorants.

38. The blend of claim 37 wherein said plasticizer is selected from the group consisting of citrates, adipates, phosphates, glycols and phthalates.

39. The blend of claim 38 in the form of shaped articles.

40. The blend of claim 37 wherein said inorganics comprise talc, $TiO_2$, $CaCO_3$, $NH_4Cl$ and silica.

41. The blend of claim 1 in the form of shaped articles.

42. The blend of claim 1 having the form of a plastic film having a tangent modulus of $2.5\times10^5$ psi to $0.01\times10^5$ psi, a tensile strength of at least about $0.5\times10^3$ psi, an average tear force of at least about 7.0 g/mil, and an elongation at break of at least about 10%.

43. The blend of claim 41 wherein said shaped articles are molding bars made from said blends have a flexural modulus of 5.0 to $10^5$ psi to $0.1\times10^5$ psi, a flexural strength of $13\times10^3$ to $0.1\times10^3$ psi, and a notched Izod (23° C.) of 1.0 to 25 ft.-lb./in.

44. The blend of claim 41 wherein said shaped article is a fiber.

45. The blend of claim 41 wherein said shaped article is a foamed object.

* * * * *

UNITED STATES PATENT AND TRADEMARK OFFICE
CERTIFICATE OF CORRECTION

PATENT NO. : 5,594,068
DATED : January 14, 1997
INVENTOR(S) : Buchanan et al.

It is certified that error appears in the above-indentified patent and that said Letters Patent is hereby corrected as shown below:

Column 16, line 4 (Claim 1, line 9), "D.8." should be --- D.S. ---.

Column 17, line 43, (Claim 23, line 1), "28" should be --- 22 ---.

Signed and Sealed this

Twenty-fourth Day of June, 1997

Attest:

BRUCE LEHMAN

*Attesting Officer*                *Commissioner of Patents and Trademarks*